United States Patent [19]
Brouwer et al.

[11] Patent Number: 5,841,982
[45] Date of Patent: Nov. 24, 1998

[54] METHOD AND SYSTEM FOR TESTING THE OPERATION OF AN ELECTRONIC MAIL SWITCH

[76] Inventors: Derek J. Brouwer, 542 West Arrowhead St., Louisville, Colo. 80027-1623; Neal Gordon Staats, 1625 Larimer #1203, Denver, Colo. 80202; David Allen Knox, 6940 Lakeview Point Dr., Longmont, Colo. 80503

[21] Appl. No.: 665,228

[22] Filed: Jun. 17, 1996

[51] Int. Cl.6 .............................. H04M 1/24; H04M 3/08; G06F 11/00
[52] U.S. Cl. ............... 395/200.54; 364/550; 364/551.01; 364/570; 395/200.53
[58] Field of Search .................... 364/550.57, 551.01; 395/200.54, 200.53; 379/89, 207, 88; 358/402; 370/428

[56] References Cited

U.S. PATENT DOCUMENTS

| | | | |
|---|---|---|---|
| 4,106,060 | 8/1978 | Chapman, Jr. | 379/100.04 |
| 4,733,345 | 3/1988 | Anderson | 379/93.02 |
| 4,962,532 | 10/1990 | Kasiraj et al. | 380/25 |
| 5,369,570 | 11/1994 | Parad | 364/468.05 |
| 5,377,354 | 12/1994 | Scannell et al. | 395/673 |
| 5,421,002 | 5/1995 | Lee et al. | 395/183.19 |
| 5,519,766 | 5/1996 | Jones | 379/89 |
| 5,557,539 | 9/1996 | Fitch | 395/200 |
| 5,633,909 | 5/1997 | Fitch | 379/89 |

Primary Examiner—Emanuel Todd Voeltz
Assistant Examiner—Cuong H. Nguyen
Attorney, Agent, or Firm—Brooks & Kushman PC

[57] ABSTRACT

A method and system for testing the operation of an electronic mail switch that supports interaction between different electronic mail applications having different formats includes generating a test message having a first format. The test message is forwarded to the electronic mail switch to generate a received message having a second format. The test message is compared with the received message based on a plurality of comparison tests. Finally, an error in the operation of the electronic mail switch can be determined based on the comparison.

24 Claims, 2 Drawing Sheets

# METHOD AND SYSTEM FOR TESTING THE OPERATION OF AN ELECTRONIC MAIL SWITCH

TECHNICAL FIELD

This invention relates to electronic mail switching applications and, more particularly, to methods and systems for testing the operation of an electronic mail switch.

BACKGROUND ART

Electronic mail (e-mail) involves sending a message from one computer account to another. It enables people to quickly communicate across vast distances. There are many different e-mail standards, developed for different types of networks, or large self-contained user communities such as commercial online services. There are a number of companies that have developed e-mail gateways, or switches, that will handle mail from many different e-mail packages, such as CCMail, MSMail, MHSMail and X.400 Mail, through many different post offices, i.e., a collection of depositories for users of the e-mail system. However, problems may arise in transferring an e-mail message having a first format to a recipient who utilizes a second format, or even the first format. That is, information in the e-mail message may be lost or restructured when it is transferred to the recipient through the e-mail switch.

Thus, there exists a need for testing the reformatting of the e-mail messages as they pass through the e-mail switch to multiple post offices either of the same type or of a different type.

DISCLOSURE OF THE INVENTION

It is a general object of the present invention to provide a method and system for testing the operation of an electronic mail switch.

The method disclosed herein includes the steps of generating a test message and forwarding the test message to an electronic mail switch to generate a received message. The method also includes the step of comparing the test message with the received message based on a plurality of comparison tests. Still further, the method includes the step of determining if there is an error in the operation of the electronic mail switch based on the comparison.

In carrying out the above-described method, a system is provided which includes means for generating a test message and forwarding the test message to the electronic mail switch to generate a received message. The system also includes means for comparing the test message with the received message based on a plurality of comparison tests. Still further, the system includes means for determining if there is an error in the operation of the electronic mail switch based on the comparison.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
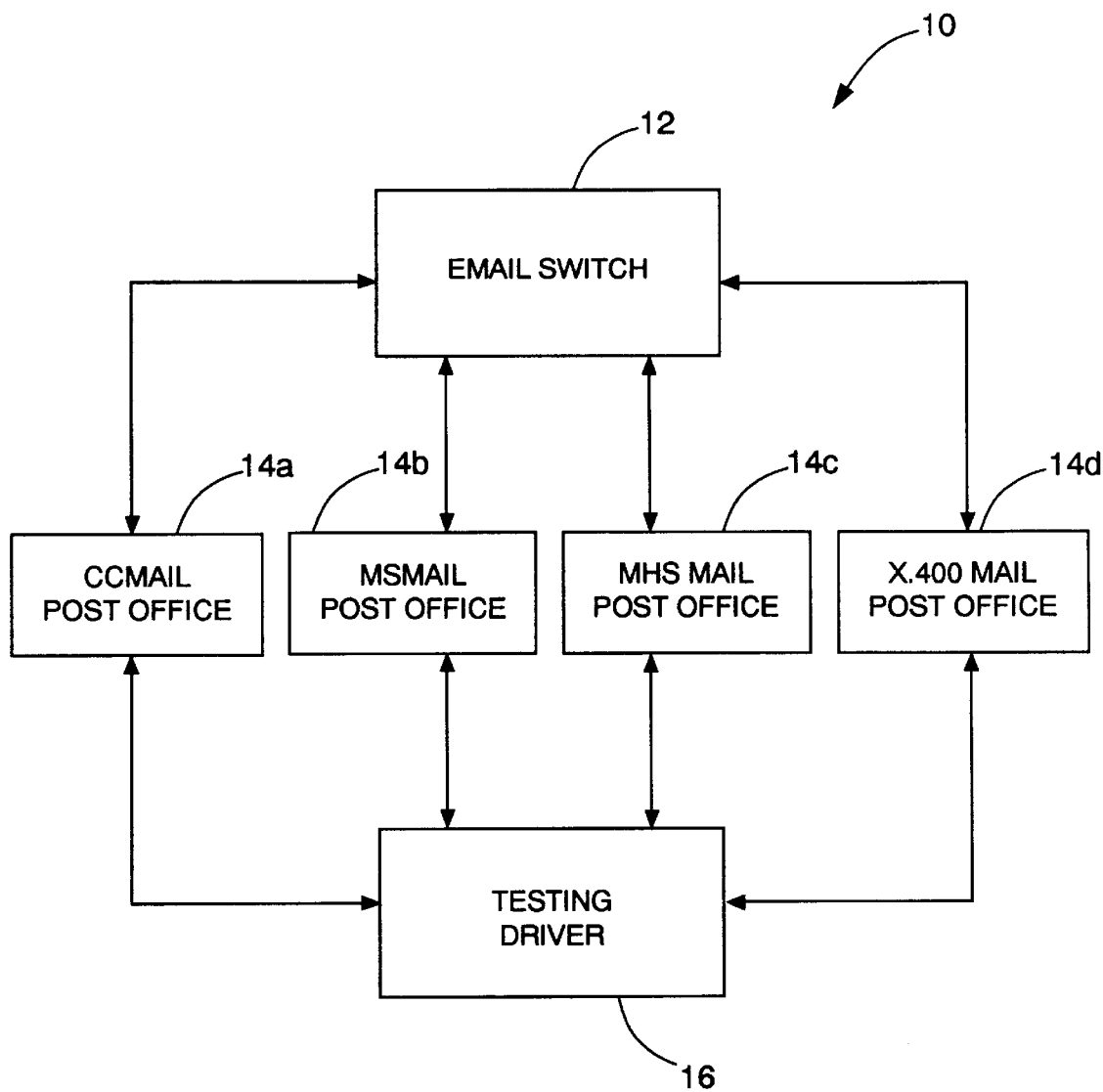
FIG. 1 is a block diagram of the system of the present invention.

Turning now to FIG. 1, there is shown a block diagram of the system of the present invention, denoted generally by reference numeral 10. The system 10 includes an electronic mail (e-mail) switch 12 for receiving e-mail messages from a first location and forwarding the e-mail messages to a second location, or destination.

The e-mail switch 12 is connected to a plurality of post offices 14a,14b,14c,14d which provide address information to the e-mail switch 12 for the various e-mail messages. Each of the post offices 14a,14b,14c,14d shown in FIG. 1 utilizes a different e-mail packages, such as cc:Mail, MS Mail, MHS Mail and X.400 Mail, respectively. The system 10 of the present invention is not limited to different e-mail packages or more than one e-mail package. The various different e-mail packages are shown for illustrative purposes only.

The system 10 further includes a testing driver 16, such as a processor, connected to each of the post offices 14 for transmitting and receiving an e-mail message and verifying the e-mail message is correct in form and content. The testing driver 16 reads data from a data file describing the e-mail message including priority, subject, author, recipient, carbon copy recipient, blind carbon copy recipient, main body, attachments and return receipt indication. After the e-mail message has been successfully sent, the testing driver 16 attempts to read the received message. If the message is received, the testing driver 16 verifies that all parts exist and are correct, i.e., all parts are the same as the sent message. The testing driver 16 then forwards or replies to the e-mail message based on corresponding flags in the data file. Return receipts are validated in a like manner.

Figure 2:
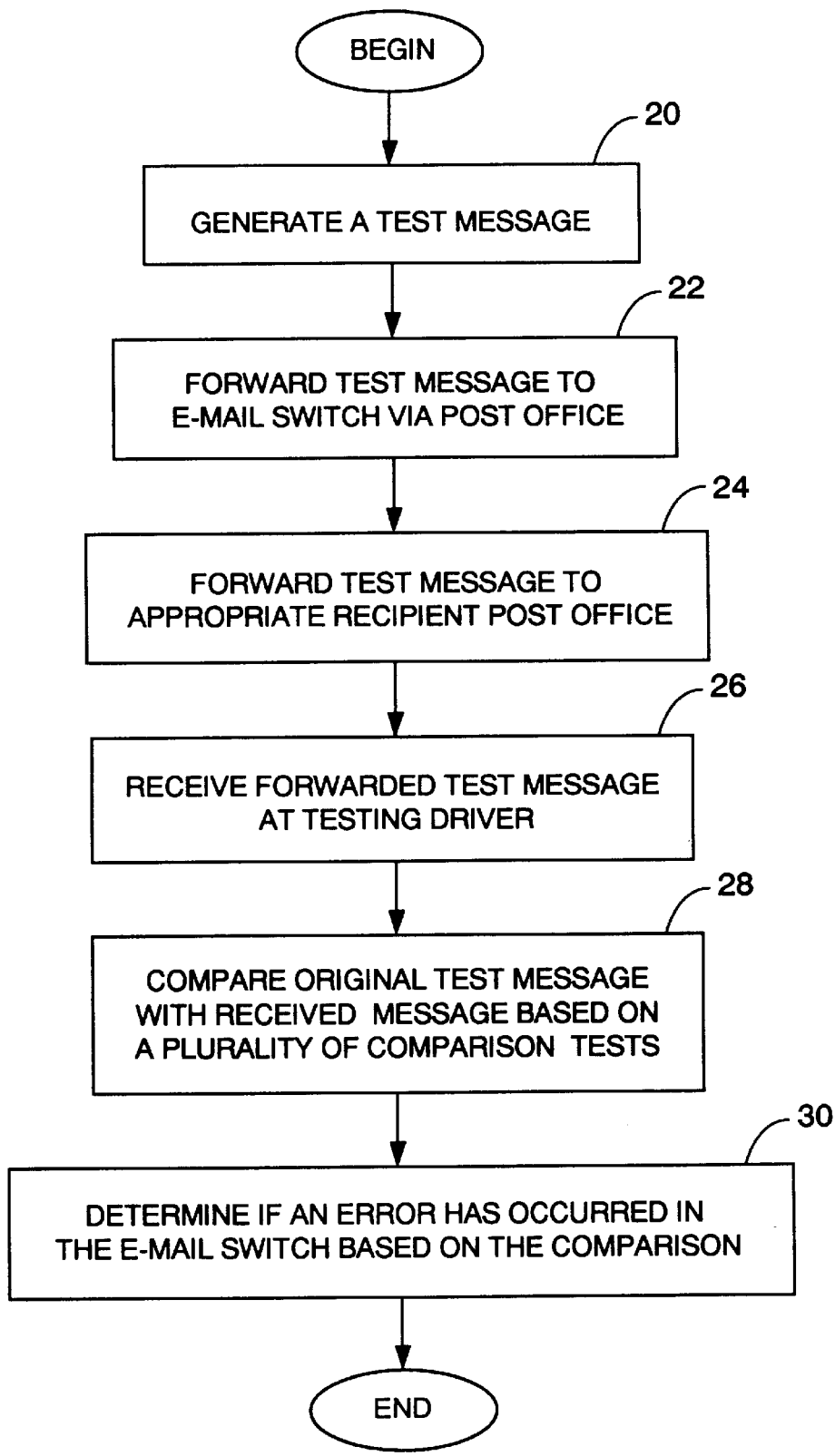
FIG. 2 is a flow diagram illustrating the general sequence of steps associated with the operation of the present invention.

Turning now to FIG. 2, there is shown a flow diagram illustrating the sequence of steps associated with the operation of the present invention. The testing driver 16 first generates a test message, as shown at block 20. A typical e-mail message may have several parts to it, such as priority, subject, author, recipient, carbon copy recipient, blind carbon copy recipient, main body, attachments and return receipt. The test message may include any combination of these parts. The test message may also be configured for receipt by the same mail package or by different mail packages.

The test message is then forwarded to the e-mail switch 12 via the post office 14 corresponding to the configuration of the test message, as shown at block 22. The e-mail switch 12 then forwards the test message to the appropriate post office 14, as shown at block 24. The test message sent to the post office 14 via the e-mail switch 12 corresponds to a received message which is transmitted to the testing driver 16, as shown at block 26.

The testing driver 16 then compares the test message with the received message according to a plurality of comparison tests, as shown at block 28. The plurality of comparison tests include a two-pass checksum performed on the main body of the test message and the received message. The first checksum pass is a strict checksum that determines a check number based on every single character in the main body of the messages. The second checksum pass is a loose checksum that ignores any special characters such as color, text style, formatting, spaces and new lines.

Consider the example in which the test message read as follows:

Hello, it is so good to hear from you.

and the received message read:

Hello, it is so good to hear from you.
The first checksum pass would identify the characters responsible for the bold face type on the word "so" and the new line character after the word "hear". The first checksum pass would determine a different check number for the test message than the check number determined for the received message, which doesn't have those characters. Thus, an error would be flagged since it appears that the e-mail switch 12 garbled the message and lost part of the main body. However, the second checksum pass ignores the special characters and generates the same check numbers for both the test message and the received message.

The plurality of comparison tests also include a comparison of the address of the test message with the address of the received message. An address typically comprises the following:

| DOMAIN | DOMAIN GROUP NAME | DOMAIN ELEMENT NAME | NATIVE ADDRESS |
|---|---|---|---|
| MSMAIL | ANYTHING | AGinther | IACTMSM2/IACTMSM2/AGINTHER |
| MHS | ATMHS | CMOLBY | CMOLBY@USWMHS |
| MHS | ATMHS | JGRAHAM | JGRAHAM@USWMHS |
| MHS | ATMS | JSMITH | JSMITH@USWMHS |
| MHS | ATMS | RADHA | RADHA@USWMHS |
| CCMAIL | BOULDER | tremote | test remote at iactccm1 | where the first column "Domain" indicates which application the user has an account with in terms of e-mail type only. The actual post office is determined with the "Domain Group Name" column. The "Domain Group Name" and the "Domain Element Name" describes the e-mail address as used by the e-mail switch 12. The final column "Native Address" is the address for the mailbox of the e-mail application. The "Native Address" is used to send and receive mail from testing driver 16. Thus, the testing driver 16 uses vendor-supplied utilities for transmitting and receiving messages. In comparing the address of the test message with the address of the received message, the testing driver 16 first converts the "Native Address" of each of the messages into a corresponding common format. The common format is represented as the domain group name and the domain element name separated by a period, i.e., "Domain Group Name. Domain Element Name." The comparison is then made based on the common format of the messages.

Another comparison performed includes a comparison of the priorities of the test message and received message. The priority system is different on each e-mail application. For example, one e-mail application may use a system of 1 to 5 to indicate priority, while another e-mail application may use U (urgent) and N (normal) or any other similar classifications. A priority error exception file is utilized to cross-reference acceptable priority classifications between the different e-mail applications. For example, "Priority, CCMAIL, 1, MSMAIL, U" indicates that the CCMAIL priority of "1" corresponds to the MSMAIL priority of "U".

Still further, a comparison of the subject matter of the test message and the received message is performed. The subject matter of an e-mail message is typically inserted into a subject line. The subject lines of the test message and the received message are compared letter for letter. No loose comparison for the subject line is allowed.

Another comparison between the test message and the received message includes the comparison of the list of addressees, or recipients. There may be some e-mail applications that do not support blind carbon copy (bcc) recipients, and the e-mail switch 12 may simply change the bcc recipients to carbon copy (cc) recipients. In this case, the testing driver 16 will indicate an error in the transmission of the test message. If this type of error is not desirable, an addressee, or recipient error exception file may be created, such as the following:

Recipient, CCMAIL, BCC, MHS, CC, indicating that an error is not to be flagged if a bcc recipient in CCMAIL is received as a cc recipient in MHS.

Finally, after completion of all the comparison tests, the testing driver 16 determines if an error has occurred in transferring the test message through the e-mail switch 12, as shown at block 30. The testing driver 16, thus, serves to test the operation of the e-mail switch 12.

Test messages are typically developed which involve rather complex messaging. For instance, a typical test message may include sending a message through the system 10, receiving the message, sending a reply, sending a return receipt, forwarding the message, receiving the reply, receiving the return receipt and receiving the forwarded message. Every time the message is received, it is checked for accuracy and acceptability. Therefore, the only time the operation of the e-mail switch 12 is checked is when the e-mail message is received. Lack of receiving a message is also checked and reported.

While the best modes for carrying out the invention have been described in detail, those familiar with the art to which this invention relates will recognize various alternative designs and embodiments for practicing the invention as defined by the following claims.

What is claimed is:

1. A method for testing the operation of an electronic mail switch that supports interaction between different electronic mail applications each having different formats, comprising:

generating a test message having a first format;

forwarding the test message to the electronic mail switch to generate a received message having a second format;

comparing the test message with the received message based on a plurality of comparison tests; and determining if there is an error in the operation of the electronic mail switch based on the comparison.

2. The method as recited in claim 1 wherein comparing the test message further includes converting the first format of the test message and the second format of the received message into corresponding common formats.

3. The method as recited in claim 1 wherein comparing the test message includes performing a two-pass checksum on the test message and the received message.

4. The method as recited in claim 3 wherein performing the two-pass checksum includes performing a strict checksum and a loose checksum.

5. The method as recited in claim 4 wherein the test message and the received message each include a body section having a first plurality of characters and wherein performing the strict checksum includes determining a first check number for the test message and the received message based on each of the first plurality of characters in the body section of the test message and the received message.

6. The method as recited in claim 5 wherein performing the loose checksum includes determining a second check number for the test message and the received message based on a second plurality of the first plurality of characters in the body section of the test message and the received message.

7. The method as recited in claim 6 wherein the first plurality of characters includes any one or more of the following: color, text, style, formatting, spaces and new lines.

8. The method as recited in claim 1 wherein comparing the test message includes comparing an addressee of the test message with an addressee of the received message.

9. The method as recited in claim 8 wherein comparing the test message includes comparing each of the addresses based on a predefined addressee error exception file.

10. The method as recited in claim 1 wherein comparing the test message includes comparing a priority of the test message with a priority of the received message.

11. The method as recited in claim 10 wherein comparing the test message includes comparing the priority of the test message with the priority of the received message based on a predefined priority error exception file.

12. The method as recited in claim 1 wherein comparing the test message includes comparing a subject line of the test message with a subject line of the received message.

13. A system for testing the operation of an electronic mail switch that supports interaction between different electronic mail applications each having different formats comprising:

means for generating a test message having a first format;

means for forwarding the test message to the electronic mail switch to generate a received message having a second format;

means for comparing the test message with the received message based on a plurality of comparison tests; and means for determining if there is an error in the operation of the electronic mail switch based on the comparison.

14. The system as recited in claim 13 wherein the means for comparing includes means for comparing a priority of the test message with a priority of the received message.

15. The system as recited in claim 14 wherein the means for comparing includes means for comparing each of the priorities based on a predefined priority error exception file.

16. The system as recited in claim 13 wherein the means for comparing includes means for converting the first and second formats into corresponding common formats.

17. The system as recited in claim 13 wherein the means for comparing includes means for performing a two-pass checksum on the test message and the received message.

18. The system as recited in claim 17 wherein the means for performing a two-pass checksum includes means for performing a strict checksum and a loose checksum.

19. The system as recited in claim 18 wherein the test message and the received message each include a body section having a first plurality of characters and wherein the means for performing the strict checksum includes means for determining a first check number for the test message and the received message based on each of the first plurality of characters in the body section of the test message and the received message.

20. The system as recited in claim 19 wherein the means for performing the loose checksum includes means for determining a second check number for the test message and the received message based on a second plurality of the first plurality of characters in the body section of the test message and the received message.

21. The system as recited in claim 20 wherein the first plurality of characters includes any one or more of the following: color, text, style, formatting, spaces and new lines.

22. The system as recited in claim 13 wherein the means for comparing includes means for comparing an addressee of the test message with an addressee of the received message.

23. The system as recited in claim 22 wherein the means for comparing each of the addressees based on a predefined addressee error exception file.

24. The system as recited in claim 13 wherein the means for comparing includes means for comparing a subject line of the test message with a subject line of the received message.

* * * * *